US011101845B2

(12) United States Patent
Teggatz et al.

(10) Patent No.: US 11,101,845 B2
(45) Date of Patent: Aug. 24, 2021

(54) SYSTEM FOR WIRELESS POWER TRANSMISSION AND COMMUNICATION

(71) Applicant: Semtech Corporation, Camarillo, CA (US)

(72) Inventors: Ross E. Teggatz, The Colony, TX (US); David John Baldwin, Allen, TX (US); Eric Christian Blackall, Plano, TX (US); Feng Hou, Coppell, TX (US); Wen Cai, Plano, TX (US); Petru Emanuel Stingu, Dallas, TX (US)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 16/133,933

(22) Filed: Sep. 18, 2018

(65) Prior Publication Data

US 2019/0089417 A1    Mar. 21, 2019

Related U.S. Application Data

(60) Provisional application No. 62/560,155, filed on Sep. 18, 2017.

(51) Int. Cl.
*H02J 7/00*    (2006.01)
*H04B 5/00*    (2006.01)
(Continued)

(52) U.S. Cl.
CPC .......... *H04B 5/0037* (2013.01); *B60L 53/126* (2019.02); *B60L 53/66* (2019.02);
(Continued)

(58) Field of Classification Search
USPC ....................................................... 320/108
See application file for complete search history.

(56) References Cited

U.S. PATENT DOCUMENTS 6,518,725 B2    2/2003 Marten
6,687,774 B2    2/2004 Milios et al.
(Continued)

FOREIGN PATENT DOCUMENTS

CN    108873080    11/2018
EP    2843855    3/2015
(Continued)

OTHER PUBLICATIONS

Notification of Transmittal of the International Search Report and Written Opinion of the International Searching Authority—European Patent Office—for International Application No. PCT/US2018/051420, dated Jan. 4, 2019, 13 pages.
(Continued)

*Primary Examiner* — Samuel Bernhanu
(74) *Attorney, Agent, or Firm* — Jackson Walker LLP; Christopher J. Rourk (57) ABSTRACT

A system is disclosed that includes a wireless power receiver, a battery charging system coupled to the wireless power receiver and configured to charge a battery using power received from the wireless power receiver and a wireless data communication system coupled to the wireless power receiver and the battery charging system, the wireless data communication system configured to determine a power requirement and to transmit the power requirement using the wireless power receiver.

16 Claims, 5 Drawing Sheets

(51) Int. Cl.
  *B60L 53/126* (2019.01)
  *H01M 10/44* (2006.01)
  *B60L 53/66* (2019.01)
  *H02J 50/80* (2016.01)
  *H02J 50/12* (2016.01)
  *H02J 7/02* (2016.01)
  *H01M 10/42* (2006.01)
  *B60L 53/22* (2019.01)

(52) U.S. Cl.
  CPC .......... *H01M 10/44* (2013.01); *H02J 7/007* (2013.01); *H02J 7/00036* (2020.01); *H02J 7/025* (2013.01); *H02J 50/12* (2016.02); *H02J 50/80* (2016.02); *B60L 53/22* (2019.02); *B60L 2210/12* (2013.01); *B60L 2210/30* (2013.01); *H01M 2010/4278* (2013.01)

(56) References Cited

U.S. PATENT DOCUMENTS

| | | | |
|---|---|---|---|
| 6,803,252 | B2 | 10/2004 | Lao et al. |
| 7,155,193 | B2 | 12/2006 | Rowe et al. |
| 7,365,580 | B2 | 4/2008 | Martin et al. |
| 7,826,542 | B2 | 11/2010 | Rowe |
| 7,848,367 | B2 | 12/2010 | Hornbuckle et al. |
| 7,907,916 | B2 | 3/2011 | Cole et al. |
| 7,933,354 | B2 | 4/2011 | Steidl et al. |
| 8,525,313 | B2 | 9/2013 | Lao et al. |
| 8,548,336 | B2 | 10/2013 | Nuttgens |
| 8,717,213 | B1 | 5/2014 | Wong |
| 9,252,834 | B2 | 2/2016 | Seller et al. |
| 9,300,405 | B2 | 3/2016 | Nuttgens |
| 9,582,111 | B2 | 2/2017 | Rouaissia et al. |
| 9,628,594 | B2 | 4/2017 | Rouaissia |
| 9,647,718 | B2 | 5/2017 | Seller |
| 9,749,012 | B2 | 8/2017 | Farrokhi et al. |
| 9,794,095 | B2 | 10/2017 | Sornin et al. |
| 9,794,748 | B2 | 10/2017 | Rouaissia et al. |
| 9,800,288 | B2 | 10/2017 | Seller et al. |
| 9,819,892 | B2 | 11/2017 | Latremouille et al. |
| 9,864,464 | B2 | 1/2018 | Rouaissia et al. |
| 10,177,813 | B1 | 1/2019 | Farrokhi |
| 2008/0070520 | A1 | 3/2008 | Mitter et al. |
| 2010/0181961 | A1* | 7/2010 | Novak .......... H04W 52/04 320/108 |
| 2014/0015595 | A1 | 1/2014 | Van Ausdall et al. |
| 2015/0016828 | A1* | 1/2015 | Swoboda .......... H04B 10/6931 398/202 |
| 2015/0137746 | A1 | 5/2015 | Lee et al. |
| 2015/0162754 | A1* | 6/2015 | Nakano .......... H02J 5/005 307/104 |
| 2015/0249339 | A1 | 9/2015 | Van Wageningen et al. |
| 2016/0197486 | A1* | 7/2016 | Von Novak, III ...... H02J 7/025 307/104 |
| 2016/0276878 | A1 | 9/2016 | Azancot et al. |
| 2016/0329751 | A1* | 11/2016 | Mach .......... H02J 5/005 |
| 2017/0126021 | A1 | 5/2017 | Desrosiers et al. |
| 2017/0141624 | A1 | 5/2017 | White, II |
| 2018/0284215 | A1 | 10/2018 | Peng |
| 2019/0089417 | A1 | 3/2019 | Teggatz et al. |

FOREIGN PATENT DOCUMENTS

| | | |
|---|---|---|
| EP | 3002883 | 4/2016 |
| EP | 3002896 | 4/2016 |
| EP | 3173807 | 5/2017 |
| EP | 3187898 | 7/2017 |
| EP | 3247046 | 11/2017 |
| EP | 3416031 | 12/2018 |
| KR | 20180004012 | 1/2018 |
| KR | 20180010141 | 1/2018 |
| KR | 20180028036 | 3/2018 |
| KR | 20180124699 | 11/2018 |
| KR | 20180124776 | 11/2018 |
| KR | 20190001560 | 1/2019 |
| WO | 2001/056062 | 8/2001 |
| WO | 2005/025069 | 3/2005 |
| WO | 2009/036390 | 3/2009 |

OTHER PUBLICATIONS

Response to Office Action dated Apr. 29, 2020 by the European Patent Office in co-pending EP Application No. 18789520.6 as-filed Nov. 6, 2020 with the European Patent Office, 21 pages.

* cited by examiner

SYSTEM FOR WIRELESS POWER TRANSMISSION AND COMMUNICATION

RELATED APPLICATIONS

The present application claims benefit of and priority to U.S. Provisional Patent Application No. 62/560,155, filed Sep. 18, 2017, which is hereby incorporated by reference for all purposes as if set forth herein in its entirety.

TECHNICAL FIELD

The present disclosure relates generally to wireless power transmission and communication, and more specifically to a system and method for wireless power transmission and communication that provide a data packet format and other suitable features to improve wireless power transmission and communication.

BACKGROUND OF THE INVENTION

Wireless power transmission is known, but is generally simple and does not include additional functionality.

SUMMARY OF THE INVENTION

A system is disclosed that includes a wireless power receiver, a battery charging system coupled to the wireless power receiver and configured to charge a battery using power received from the wireless power receiver and a wireless data communication system coupled to the wireless power receiver and the battery charging system, the wireless data communication system configured to determine a power requirement and to transmit the power requirement using the wireless power receiver.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

A wireless power interface can rely on a tuned driver and tuned receiver to maximize power transfer. Communication to modulate the voltage and current driving capability at the load can be managed by modulating capacitive loads on the receiver side which creates a reflection of the signal onto the transmitter side. However, modulating the receiver can cause detuning of the receiver complex network, which reduces the efficiency of power transfer. By minimizing the number of pulses required in the communication on the receiver side, detuning can be controlled. In order to solve this previously unidentified problem, a novel approach to using both frequency and pulse duration between communication packets is disclosed that provides a technical solution to the problem of detuning of power transmission when data transmission is included over the same channel.

Figure 1:
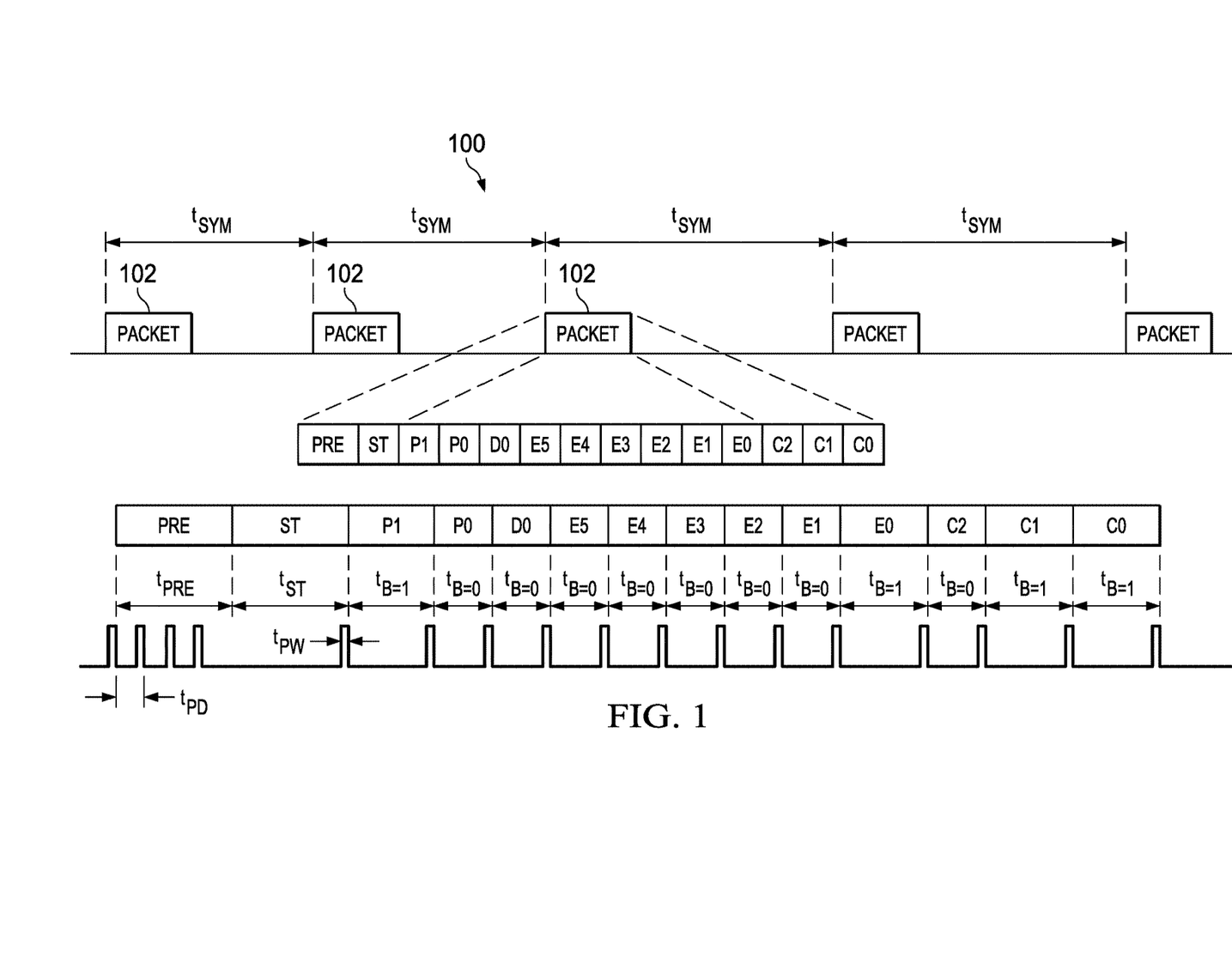
FIG. 1 is a diagram showing an exemplary data packet format, in accordance with an example embodiment of the present disclosure.

FIG. 1 is a diagram showing an exemplary data packet format 100, in accordance with an example embodiment of the present disclosure. Data packet format 100 provides functionality specific to a wireless power and communications system, such as the prevention of detuning by minimization of data pulse frequency and duration.

Data packet format 100 includes packets 102, which are transmitted once every $t_{sym}$ period, where the packet duration is substantially lower than $t_{sym}$ so as to prevent detuning. Each packet 102 can include one or more of the following bits:

PRE—preliminary sequence of one or more pulse, each having a suitable pulse width such as 20 microseconds, where each pulse can be separated by a predetermined period of time if there are two or more pulses, such as 250 microseconds, and having a total predetermined time, such as 1000 microseconds. The pulse(s) can start at the beginning of the predetermined time, can occur at the end of the predetermined time or can occur at any suitable point during the predetermined time.

ST—start sequence of one or more pulse, each having a suitable pulse width such as 20 microseconds, separated by a predetermined time and having a total predetermined time, such as 1000 microseconds. The pulse(s) can start at the beginning of the predetermined time, can occur at the end of the predetermined time or can occur at any suitable point during the predetermined time.

P1—power bit having a suitable pulse width such as 20 microseconds and having a total predetermined time, such as 750 microseconds. The pulse(s) can start at the beginning of the predetermined time, can occur at the end of the predetermined time or can occur at any suitable point during the predetermined time.

P0—power bit having a suitable pulse width such as 20 microseconds and having a total predetermined time, such as 500 microseconds. The pulse(s) can start at the beginning of the predetermined time, can occur at the end of the predetermined time or can occur at any suitable point during the predetermined time.

D0—data bit having a suitable pulse width such as 20 microseconds and having a total predetermined time, such as 500 microseconds. The pulse(s) can start at the beginning of the predetermined time, can occur at the end of the predetermined time or can occur at any suitable point during the predetermined time.

E5-E1—extension bits, each having a suitable pulse width such as 20 microseconds and having a total predetermined time, such as 500 microseconds. The pulse(s) can start at the beginning of the predetermined time, can occur at the end of the predetermined time or can occur at any suitable point during the predetermined time.

E0—extension bit having a suitable pulse width such as 20 microseconds and having a total predetermined time, such as 750 microseconds. The pulse(s) can start at the beginning of the predetermined time, can occur at the end of the predetermined time or can occur at any suitable point during the predetermined time.

C2—control record check bit having a suitable pulse width such as 20 microseconds and having a total predetermined time, such as 500 microseconds. The pulse(s) can start at the beginning of the predetermined time, can occur at the end of the predetermined time or can occur at any suitable point during the predetermined time.

C1-C0—control record check bits, each having a suitable pulse width such as 20 microseconds and having a total predetermined time, such as 750 microseconds. The pulse(s) can start at the beginning of the predetermined time, can occur at the end of the predetermined time or can occur at any suitable point during the predetermined time.

The following example bit sequences can be used to encode data for use by a processor, or other suitable bit sequences can also or alternatively be used:

| Power bits data | | |
|---|---|---|
| P1 | P0 | |
| 0 | 0 | More power |
| 0 | 1 | No change |
| 1 | 0 | End of power |
| 1 | 1 | Less power |

The data bit D0 can be set to a predetermined value such as "0" to indicate that an extended packet is being used. Extension bits E5 through E2 can be set to a predetermined value such as "0 0 0 0" for an extended packet.

| Extension bits data | | |
|---|---|---|
| E1 | E0 | |
| 0 | 0 | Precharge |
| 0 | 1 | "1 C" charging |
| 1 | 0 | Topoff |
| 1 | 1 | Fully charged |

The control record check bits can be encoded based on a suitable control record protocol, such as to encode a number of "1" bits in the P1, P0, D0, E1 and E0 bits, or other suitable data.

The packet width is not required to be fixed in time and can vary with different communication requirements within a packet. Each bit value can be determined by an initial pulse falling/rising edge and the time to the next rising/falling edge pulse, or other suitable encoding processes can also or alternatively be used. In order to minimize noise transients from being misread as a pulse edge, a pulse detector can be used to apply an algorithm to determine when the pulse has predetermined threshold characteristics, such as being high enough and/or wide enough. The pulse detector algorithm can be implemented using analog circuitry, digital filtering or a combination of both, depending on the load and the detection voltage that is being observed or other suitable parameters.

A receiver circuit can be detuned in varying degrees by modifying or adjusting capacitor values at communication port switches, such as to encode multiple bits of data at a given time. The detuning can be achieved by providing a higher magnitude pulse at the transmit side, which can be then used as a distinguishing signal. Suitable processing can also be utilized with multiple receivers to distinguish which receiver is communicating with the common transmitter side. Additionally, the capacitors at the communication switches can be dynamically adjusted to provide additional flexibility in the communication protocol, such as establishment of a master receiver and follower receivers. Magnitude adjustment can also be used to send additional levels of information in the packet stream without adding additional pulses, such as by using four levels as opposed to two levels (binary), or other suitable level-related signaling.

Figure 2:
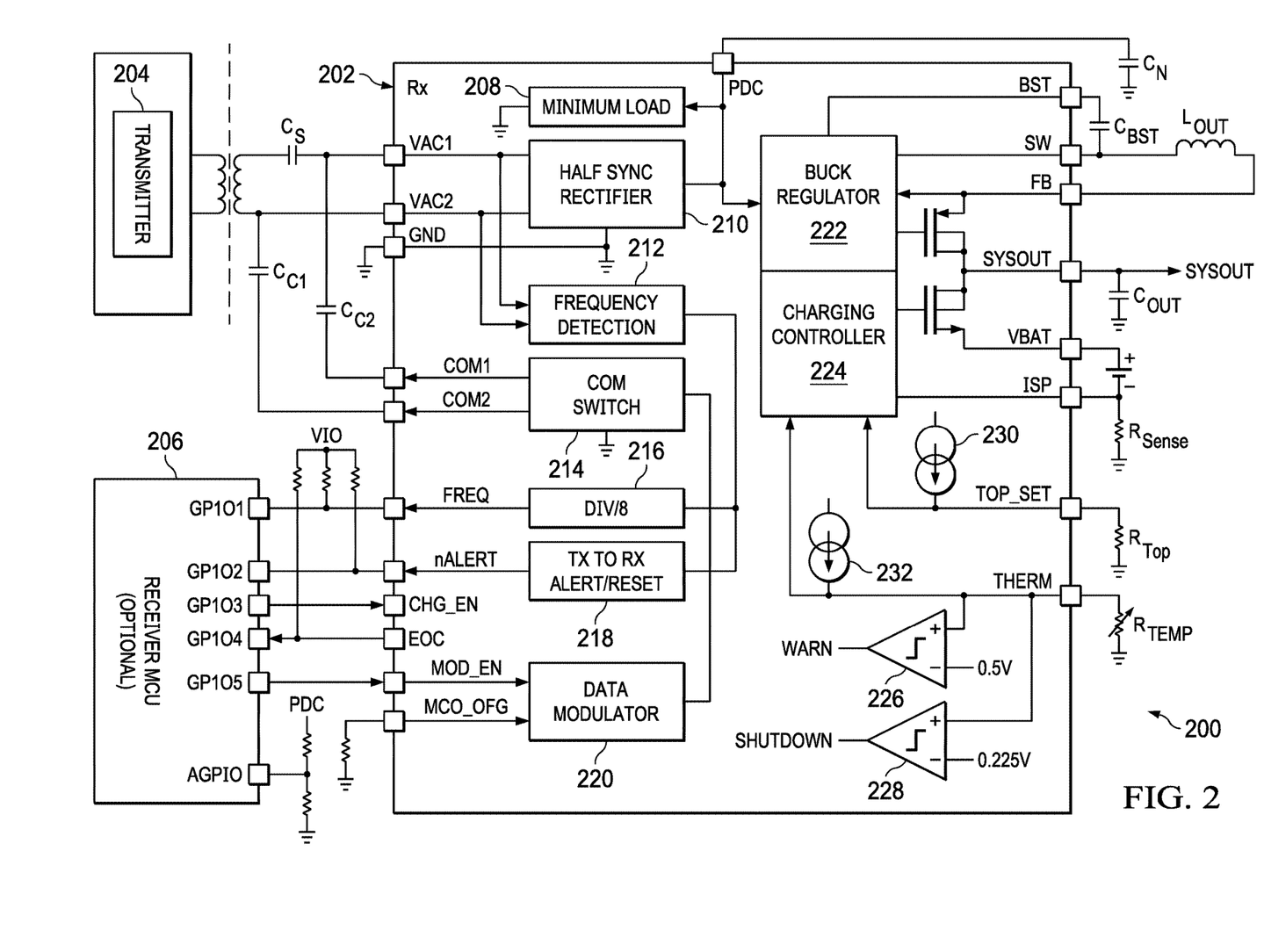
FIG. 2 is a diagram of a system for utilizing the data packet format, in accordance with an example embodiment of the present disclosure.

FIG. 2 is a diagram of a system 200 for utilizing the data packet format 100, in accordance with an example embodiment of the present disclosure. System 200 includes transmitter 204, receiver 202 and receiver master control unit 206, each of which can be implemented in hardware or a suitable combination of hardware and software.

Transmitter 204 transmits a power signal to receiver 202, such as by forming a resonant circuit with receiver 202 to allow for efficient transmission of wireless power. In addition, transmitter 204 can receive data communications over the wireless power transmission channel, such as by decoding data that has been modulated onto the wireless power transmission channel. Transmitter 204 can thus include one or more control circuit and systems for controlling the formation of a resonant circuit, for transmitting power and for receiving data, such as one or more transistors, capacitors, inductors and one or more controllers, such as a microcontroller that has been programmed to perform predetermined functions and to analyze encoded data from the wireless power transmission channel.

Receiver 202 includes one or more circuits and systems that are used to receive wireless power, form and control a resonant communications channel for wireless power transfer, charge a local battery, switch from a wireless power source to the local battery as a power source, encode status and operating condition data for transmission to the transmitter over the resonant communications channel and transmit the encoded data in a format that reduces a loss of resonance in the resonant communications channel. Receiver 202 can include a microcontroller operating under the control of one or more algorithms to provide and coordinate the functions of minimum load 208, half sync rectifier 210, frequency detection 212, com switch 214, divider 216, transmitter to receiver alert/reset 218, data modulator 220, buck regulator 222, charging controller 224, current sources 230 and 232 and other suitable functions.

Receiver master control unit 206 provides one or more user indicators or controls for receiver 202, such as a charge enable control, an end of charge indicator, transmitter to receiver alerts, data modulator enable and so forth. Receiver master control unit 206 can include one or more circuits and systems, such as a programmable microcontroller.

System 200 regulates a constant output voltage at SYSOUT that is independent of the battery voltage VBAT, which allows receiver 202 to be battery powered. When the battery voltage falls below a predetermined voltage, AC power is applied and a switched mode power supply is enabled. Charging controller 224 regulates the level of ISP current to linearly charge the battery at a lower rate when the battery voltage is low, and at a top-off rate when the battery voltage is equal to or greater than a predetermined value.

In startup mode of operation, the voltage provided to PDC of receiver 202 can be managed to prevent unwanted voltage spikes using minimum load switch 208, which can be enabled to provide a minimum load to prevent these spikes. Once operation is in a steady state and the system is under closed loop control, minimum load switch 208 can be turned off so that the startup load is removed from the system, such that the overall efficiency from the transmitter 204 to the receiver 202 is increased.

Power management to the receiver 202 side can be managed by sensing the PDC voltage and then generating communication packets for transmission over COM1 and COM2, as discussed (maximum power, increase power, decrease power, no change). These control signals can be used to cause transmitter 204 to adjust the power output to receiver 202 on a packet by packet basis. If the voltage measured at PDC is too low, the control to increase power or to send maximum power can be encoded to cause transmitter 204 to respond appropriately, such as by using a microprocessor with suitable programming to decode data signals having power level indications and to adjust a transmitted power level accordingly. Transmitter 204 is configured to receive the encoded data and to decode the data and to responsively modify the operation of subsystems of transmitter 204. If the voltage measured at PDC is too high, the control to send less power or no power can be encoded for transmission in the data packet, to cause transmitter 204 to respond. Data communications to transmitter 204 can be accomplished by de-tuning a resonant network of capacitors coupled to com switch 214 or in other suitable manners.

In addition, system 200 can operate in a higher efficiency under moderate load conditions, such as by using a half-bridge configuration of half-sync rectifier 210, which can be modulated from half bridge to full bridge as a function of the load requirements of the system.

In-band communication at the COM1 and COM2 ports can be performed at a high frequency so that transmission over long ranges can be achieved. This provides the added benefit of not having to use an alternative communication link such as Bluetooth which can add to the complexity and cost of the system.

Com switch 214 can be controlled by external pins that can be connected to a microcontroller in receiver 202, so that the microcontroller can encode and modulate data to be sent to transmitter 204, to decode data that is received from transmitter 204 or for other suitable purposes.

Charging of the battery can be controlled using charge enable input CHG_EN, and an end of charge state can be indicated on EOC output. The SYSOUT output is used to provide power to the system controlled by receiver 202. Current source 232 drives thermistor $R_{TEMP}$ and triggers warning indicator 226 and shutdown indicator 228 when the differential voltage across each reaches the indicated threshold, which can be adjusted to accommodate shutdown at different levels when temperature is increasing or decreasing. The topoff voltage setting to charging controller 224 can be externally set through the TOP_SET pin, such as by providing current to $R_{Top}$ from current source 230.

Figure 3:
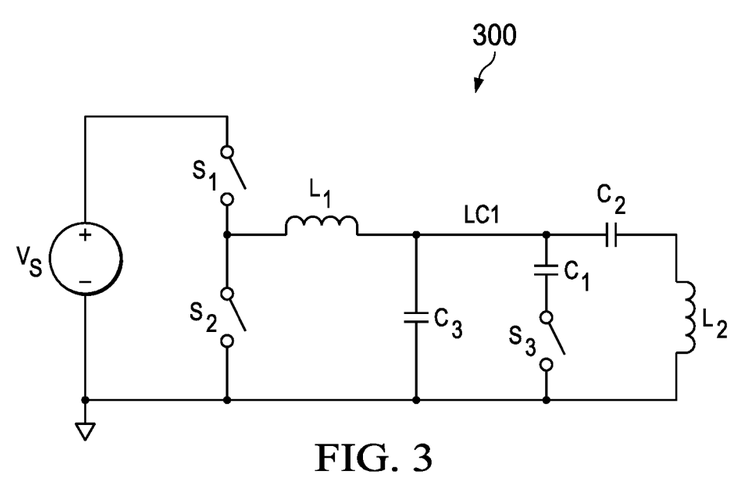
FIG. 3 is a diagram of a filter circuit, in accordance with an example embodiment of the present disclosure.

FIG. 3 is a diagram of a filter circuit 300, in accordance with an example embodiment of the present disclosure. Filter circuit 300 includes voltage source Vs, switches S1, S2 and S3, inductors L1 and L2 and capacitances C1, C2 and C3, each of which can be discrete components, integrated components in a single integrated circuit or a suitable combination of discrete and integrated circuits and components.

When the half bridge formed by S1 and S2 is being switched at a given frequency, a gain is observed at the output of LC1. As a result of this, a higher power output can be achieved at the output coils. In addition, LC1 can be tuned by switching in or out additional capacitance and/or inductance, and as a result the gain achieved at the output of LC1 can be adjusted. This works well for high frequency operation such as used in magnetic resonant systems. An optional capacitance C3 can be used to set the gain when S3 is open. In addition, the half bridge can alternatively be a full bridge.

Figure 4:
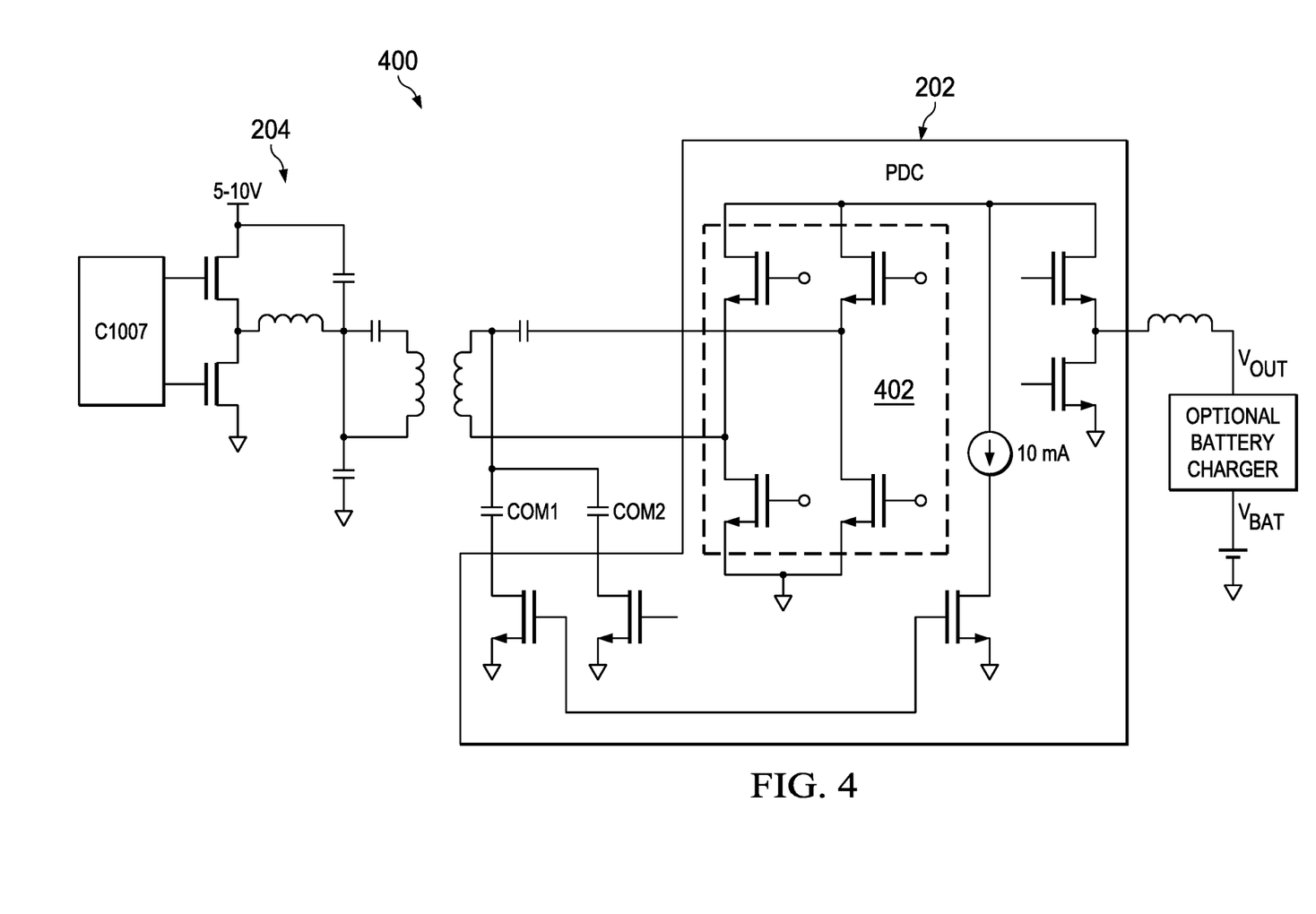
FIG. 4 is a diagram for controlling a receiver to selectively transmit data to a transmitter, in accordance with an example embodiment of the present disclosure.

FIG. 4 is a diagram 400 for controlling receiver 202 to selectively transmit data to transmitter 204, in accordance with an example embodiment of the present disclosure. Transmitter 204 includes two transistors coupled to an integrated transmitter controller, and an inductor and capacitive network of three capacitances coupled to a primary of an inductive coupling mechanism. Receiver 202 includes a transistor bridge coupled to the secondary of the inductive coupling mechanism, a current source coupled to a transistor, transistors coupled to COM1 and COM2, and transistors coupled to an inductor at an output, which is shown coupled to an optional battery charger. One or more components of diagram 400 can be equivalent to corresponding components shown in FIG. 2.

Bridge 402 on receiver 202 can be used as an output to create a transmitter function. The output from buck regulator 222 can operate in reverse as a boost regulator to provide a boosted PDC from battery VBAT to bridge 402 when receiver 202 is used as a transmitter, in which state it can have its power output controlled by the boost regulator, by adjusting the PDC voltage.

Figure 5:
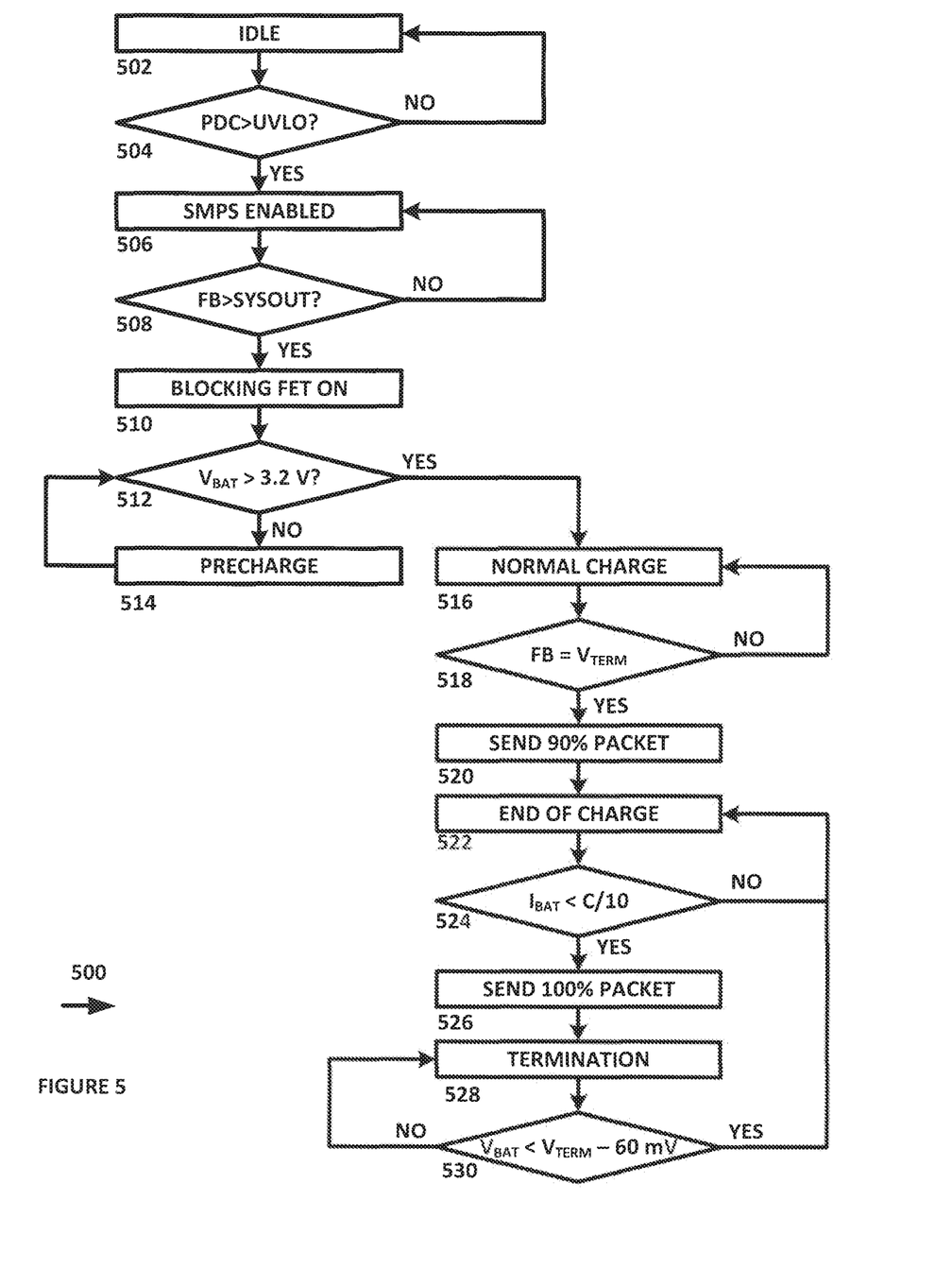
FIG. 5 is a diagram of an algorithm for controlling charging of a battery at a wireless power receiver, in accordance with an example embodiment of the present disclosure.

FIG. 5 is a diagram of an algorithm 500 for controlling charging of a battery at a wireless power receiver, in accordance with an example embodiment of the present disclosure. Algorithm 500 can be implemented on one or more processors.

Algorithm 500 begins at 502, where a receiver is in an idle state. In the idle state, a battery can be coupled to a system output, a blocking FET or other suitable switch that is used to control charging of the battery can be turned on and other suitable actions can be taken or states can be implemented. The algorithm then proceeds to 504.

At 504, it is determined whether the system operating voltage PDC is greater than a predetermined under voltage lockout level. If it is determined that the voltage is not greater than the under voltage lockout level, the algorithm returns to 502, otherwise the algorithm proceeds to 506.

At 506, a switched mode power supply is enabled, and the algorithm proceeds to 508 where it is determined whether a feedback voltage is greater than a system output voltage. If the feedback voltage is not greater than the system output voltage, the algorithm returns to 506, otherwise the algorithm proceeds to 510 where a blocking FET is turned on, such as to allow a battery to be charged. The algorithm then proceeds to 512.

At 512, it is determined whether the battery voltage is greater than a predetermined voltage level. If it is determined that the battery voltage is not greater than that level, the algorithm proceeds to 514 where a precharge level of battery charging is selected, such as at a lower level. In addition, battery status data can be encoded and modulated onto a resonant wireless power transmission channel or other suitable communications media. Otherwise, the algorithm proceeds to 516 where a normal battery charging level is implemented. The algorithm then proceeds to 518.

At 518, it is determine whether the feedback voltage is equal to a predetermined terminal voltage. If the feedback voltage is not equal to a predetermined terminal voltage, the algorithm returns to 516, otherwise the algorithm proceeds to 520 where a 90% charge control signal is encoded and transmitted from the receiver to the transmitter. The algorithm then proceeds to 522.

At 522, an end of charge protocol is implemented, such as by regulating the voltage level of a system output as a function of a terminal voltage level or in other suitable manners. In addition, end of charge data can be encoded and modulated onto a resonant wireless power transmission channel or other suitable communications media. The algorithm then proceeds to 524.

At 524, it is determined whether a battery current is less than a predetermined level. If not, then the algorithm returns to 522, otherwise the algorithm proceeds to 526 where a 100% charge control signal is encoded and transmitted from the receiver to the transmitter. The algorithm then proceeds to 528.

At 528, a termination protocol is implemented. In one example embodiment, the system output voltage can be regulated to a terminal voltage, charging can be disabled, a battery can be disconnected, a signal can be provided to an end of charge output indicator, battery/charge or other status data can be encoded and modulated onto a resonant wireless power transmission channel or other suitable communications media, and other suitable processes can also or alternatively be used. The algorithm then proceeds to 530.

At 530, it is determined whether a battery voltage is less than a terminal voltage minus a predetermined amount, such as 60 mV. If not, the algorithm returns to 528, otherwise the algorithm returns to 522.

Although algorithm 500 is shown as a flow chart, one of ordinary skill will understand that it can be implemented as one or more separate flow charts, state machines, or in other suitable manners.

Additional exemplary embodiments are also provided for the purpose of providing non-limiting examples of the disclosure. To the extent that any specific values are disclosed for parts, circuit components, circuit arrangements or the like, those values are exemplary and would be understood by one of skill in the art to be applicable to other designs that utilize the inventive concepts disclosed herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system comprising:
a wireless power receiver;
a battery charging system coupled to the wireless power receiver and configured to charge a battery using power received from the wireless power receiver;
a wireless data communication system coupled to the wireless power receiver and the battery charging system,
the wireless data communication system configured to determine a power requirement and to transmit the power requirement using the wireless power receiver at a frequency derived from and different from a transmission frequency detected by a frequency detector at the wireless power receiver; and
a data encoding system configured to encode one or more bits representing a pulse width into a data packet to control a power signal transmitted to the wireless power receiver at the transmission frequency detected by the frequency detector.

2. The system of claim 1, wherein each bit comprises a pulse width that reduces loss of resonance.

3. The system of claim 1, wherein at least two bits are used to indicate that more power should be transmitted.

4. The system of claim 1, wherein at least two bits are used to indicate that no change should be made in the level of power that is transmitted.

5. The system of claim 1, wherein at least two bits are used to indicate that less power should be transmitted.

6. The system of claim 1, wherein at least two bits are used to indicate that no more power should be transmitted.

7. The system of claim 1, wherein at least two bits are used to indicate a battery charging level.

8. The system of claim 1, wherein at least two bits are used to indicate a control record check having a predetermined pulse width.

9. A method comprising:
receiving power at a wireless power receiver;
charging a battery using power received from the wireless power receiver;
determining a power requirement;
transmitting the power requirement using the wireless power receiver using a frequency derived from and different from a transmission frequency detected by a detector at the wireless power receiver; and
encoding one or more bits into a data packet to control a power signal transmitted to the wireless power receiver, wherein each bit has a different pulse width if it is determined that a voltage is greater than an under voltage lockout level.

10. The method of claim 9, wherein at least one bit comprises a pulse width that reduces loss of resonance.

11. The method of claim 9, wherein at least one bit has a different pulse width from a pulse width used to encode non-power data.

12. The method of claim 9, wherein at least two bits are used to indicate that no change should be made in the level of power that is transmitted, wherein each bit has a different pulse width.

13. The method of claim 9, wherein each bit has a different pulse width and transmission period.

14. The method of claim 9, wherein each bit has one of a first pulse width or a second pulse width.

15. The method of claim 9, wherein at least two bits are used to indicate a battery charging level.

16. The method of claim 9, wherein one bit has a first pulse width and a second bit has a second pulse width that is different from the first pulse width.

* * * * *